(12) United States Patent
Higuchi et al.

(10) Patent No.: US 7,981,507 B2
(45) Date of Patent: Jul. 19, 2011

(54) PRIMER COMPOSITION AND COATED ARTICLE

(75) Inventors: Koichi Higuchi, Annaka (JP); Masaaki Yamaya, Annaka (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 161 days.

(21) Appl. No.: 11/870,685

(22) Filed: Oct. 11, 2007

(65) Prior Publication Data

US 2008/0096029 A1    Apr. 24, 2008

(30) Foreign Application Priority Data

Oct. 19, 2006 (JP) ................................ 2006-285173
Feb. 16, 2007 (JP) ................................ 2007-036412

(51) Int. Cl.
*B32B 9/04* (2006.01)
*C08K 3/36* (2006.01)

(52) U.S. Cl. ........ 428/331; 428/451; 524/492; 524/493; 524/547

(58) Field of Classification Search .................. 428/331, 428/451; 524/492, 493, 547
See application file for complete search history.

(56) References Cited

U.S. PATENT DOCUMENTS

| | | | | |
|---|---|---|---|---|
| 4,353,959 A | | 10/1982 | Olson et al. | 428/331 |
| 5,021,266 A | | 6/1991 | Yamaya et al. | 427/379 |
| 5,445,871 A | * | 8/1995 | Murase et al. | 428/215 |
| 6,620,509 B1 | | 9/2003 | Yamamoto et al. | 428/412 |
| 6,855,768 B2 | | 2/2005 | Matsumura et al. | 525/100 |

FOREIGN PATENT DOCUMENTS

| | | |
|---|---|---|
| EP | 1 408 082 A2 | 4/2004 |
| JP | 56-92059 | 7/1981 |
| JP | 1-149878 | 6/1989 |
| JP | 8-151415 | 6/1996 |
| JP | 3102696 | 8/2000 |
| JP | 2001-47574 | 2/2001 |
| JP | 2001-114841 | 4/2001 |
| JP | 2001-214122 | 8/2001 |
| JP | 2004-1393 | 1/2004 |

OTHER PUBLICATIONS

Patent Abstracts of Japan JP 04-120181, Funaki et al, Apr. 21, 1992.*

* cited by examiner

*Primary Examiner* — D. S Nakarani
(74) *Attorney, Agent, or Firm* — Oblon, Spivak, McClelland, Maier & Neustadt, L.L.P.

(57) ABSTRACT

A primer composition for a polysiloxane hard coating is provided. This primer composition comprises (A) a vinyl polymer having a hydrolyzable silyl group and/or SiOH group and an organic UV absorbing group bonded to its side chain, and (B) fine silica particles dispersed in an organic solvent, and the primer layer formed after coating and curing has a coefficient of linear expansion of up to $150 \times 10^{-6}/°C$.

20 Claims, No Drawings

PRIMER COMPOSITION AND COATED ARTICLE

CROSS-REFERENCE TO RELATED APPLICATION

This non-provisional application claims priority under 35U.S.C. §119(a) on Patent Application Nos. 2006-285173 and 2007-036412 filed in Japan on Oct. 19, 2006 and Feb. 16, 2007, respectively, the entire contents of which are hereby incorporated by reference.

TECHNICAL FIELD

This invention relates to a primer composition containing a vinyl polymer having a hydrolyzable silyl group and/or SiOH group and an organic UV absorbing group bonded to its side chain and fine silica particles dispersed in an organic solvent; and an article comprising a substrate, a cured primer layer formed by coating and curing the primer composition on the substrate, and a cured polysiloxane coating formed on the cured primer layer.

BACKGROUND ART

Recently, transparent glass plates are being replaced in various fields with transparent materials which are nonfragile or less fragile compared to glass materials. For example, plastic substrates, and in particular, polycarbonate resin substrates are used in various applications such as windows of buildings and automobiles and instrument covers as a replacement for glass materials in consideration of their excellent transparency, impact resistance, and heat resistance.

However, polycarbonate resin molded articles are inferior in surface properties such as scratch resistance and weatherability compared to the glass, and improvement in such surface properties is sincerely desired. Recent demands include development of polycarbonate resin molded articles which can endure more than 10 years of outdoor exposure so that the article can be used in applications such as automobile windows and highway noise barriers.

Various means have been proposed for improving the weatherability of the polycarbonate resin molded articles. Exemplary such proposals include formation of a film of acrylic resin having high weatherability on the surface of the polycarbonate resin substrate, and formation of a resin layer containing an UV absorbent on the resin surface, for example, by coextrusion.

For the improvement of scratch resistance of the polycarbonate resin molded articles, coating of a thermosetting resin such as polyorganosiloxane or melamine resin, and coating of a polyfunctional acrylic photocurable resin have been proposed.

In the meanwhile, JP-A 56-92059 and JP-A 1-149878 (Patent Documents 1 and 2) disclose a method for producing a transparent article having the weatherability simultaneously with the scratch resistance, and in a known UV absorbent transparent substrate, a protective film of a colloidal silica-containing polysiloxane is formed on a primer layer containing a large amount of UV absorbent.

However, incorporation of a large amount of UV absorbent in the primer layer generated various adverse effects such as inferior adhesion with the underlying substrate or the overlying protective coating formed by coating a colloidal silica-containing polysiloxane coating composition on the primer layer, removal of the UV absorbent from the composition by volatilization during the curing at an elevated temperature, and generation of cracks and whitening or yellowing by the bleeding out of the UV absorbent in the long term outdoor use. In the meanwhile, addition of a large amount of UV absorbent to the protective coating comprising the colloidal silica-containing polysiloxane was difficult in view of the loss of the scratch resistance.

JP-A 8-151415 (Patent Document 3) discloses use of a mixture of a benzotriazole UV absorbing vinyl monomer or a benzophenone UV absorbing vinyl monomer and a vinyl monomer which is copolymerizable with such monomer as a component of the coating composition, and formation of a protective coating of this coating composition on a synthetic resin. This protective coating, however, has only limited scratch resistance due to the use of the vinyl polymer.

JP-A 2001-114841, Japanese Patent No. 3102696, JP-A 2001-214122, and JP-A 2001-47574 (Patent Documents 4 to 7) disclose resin articles coated with a multilayer coating, and the coating has good adhesion to the resin substrate as well as high weatherability. In these resin articles, a benzotriazole UV absorbing vinyl monomer or a benzophenone UV absorbing vinyl monomer, an alkoxy silyl group-containing vinyl monomer, and a vinyl monomer which is copolymerizable with such monomers are used for the components of the coating composition.

In these articles, a coating composition containing a copolymer is used for the primer composition, and the primer coating is overcoated with a coating of a colloidal silica-containing polysiloxane resin to thereby provide scratch resistance and weatherability with the article. Despite considerable improvement in the adhesion to the overlying polysiloxane resin coating and in the weatherability, long term weatherability was still insufficient since formation of the crosslink network by the alkoxysilyl group in the primer layer was insufficient and the coating experienced deformation by the subsequent gradual crosslinking of the alkoxysilyl group or the hydroxysilyl group which was not involved in the curing, and such deformation resulted in the defects such as cracks and peeling. In addition, when the coating experienced rapid change in the ambient temperature, and in particular, in the high temperature range, the coating was more likely to experience the cracks by such post-crosslinking.

JP-A 2004-1393 (Patent Document 8) discloses an attempt to improve adhesion and crack generation of the coating by limiting difference in the coefficient of linear expansion between the substrate and the acrylic resin layer (primer layer) and the difference in the coefficient of linear expansion between the primer layer and the cured polysiloxane layer. However, long term weatherability was still insufficient because of the limited amount of the UV absorbent that could be incorporated in this primer layer.

DISCLOSURE OF THE INVENTION

The present invention has been completed in view of the situation as described above, and an object of the present invention is to provide a primer composition for forming a protective coating which does not exhibit defects such as cracks, peeling, and yellowing for a long time, and which has excellent weatherability. Another object of the present invention is to provide a coated article produced by using such primer composition.

The inventors of the present invention made an intensive study to achieve such objects and found that long term weatherability can be provided by coating a substrate with a primer composition comprising (A) a vinyl polymer having a hydrolyzable silyl group and/or SiOH group and an organic UV absorbing group bonded to its side chain, and (B) fine silica particles dispersed in an organic solvent, wherein the primer layer formed by coating such primer composition has a coefficient of linear expansion of up to $150\times10^{-6}/°$ C. The inventors also found that, the substrate can be simultaneously provided with the long term weatherability and scratch resistance when the primer layer comprising such primer composition is overlaid with a polysiloxane hard resin coating.

In other words, the inventors of the present invention made various investigations on the primer compositions which is capable of forming a coating that provides long term weatherability with an article molded from a thermoplastic resin such as polycarbonate.

As a result of such investigation, the inventors found that a coating formed from a primer composition containing (A) a vinyl polymer having a hydrolyzable silyl group and/or SiOH group and an organic UV absorbing group bonded to its side chain, and (B) fine silica particles dispersed in an organic solvent as its constituents will exhibit a coefficient of linear expansion of up to $150\times10^{-6}/°$ C. as well as an expansion and a contraction by temperature difference smaller than those of the conventional primers, because of the compact three dimensional crosslink network formed by mutual siloxane crosslinking between the hydrolyzable silyl group and/or SiOH group of the vinyl polymer (A), and siloxane crosslinking between the hydrolyzable silyl group and/or SiOH group of the vinyl polymer (A) and the SiOH group on the surface of the fine silica particles (B), as well as low expansion rate inherent to the fine silica particles (B); and as a consequence, the polysiloxane hard resin coating formed on this primer coating is less likely to experience cracks and peeling for a prolonged period.

In addition, since the vinyl polymer (A) has an organic UV absorbing group bonded to its side chain and the vinyl polymer (A) undergoes crosslinking in the coating formed from the primer composition, the UV absorbing group is fixedly secured within the coating, and the UV absorbing group is extremely unlikely to experience transfer to the coating surface. As a consequence, the primer layer is less likely to experience whitening of the outer appearance, loss of adhesion property, dissolution or elution into water and other solvents, gradual loss of the UV absorbing property, and volatilization of the UV absorbing group from the primer layer in the course of thermosetting step at a high temperature, and accordingly, the primer coating has a dramatically improved weatherability and this weatherability is retained for a long period.

The inventors also found that, when a hard protective layer of an organopolysiloxane is formed on the surface of the coating formed from the primer composition of the present invention, the adhesion between the primer layer and the organopolysiloxane protective layer is improved because of the reactivity of the primer layer with the organopolysiloxane protective layer provided by the hydrolyzable silyl group and/or the SiOH group in the vinyl polymer (A) and the SiOH group on the surface of the fine silica particles (B); and an improved heat resistance as well as excellent scratch resistance and weatherability are provided by the crosslinking of the hydrolyzable silyl group and/or the SiOH group. The present invention has been completed on the basis of such findings.

Accordingly, the present invention provides a primer composition as described below. The present invention also provides an article coated with such primer composition as described below.

[I] A primer composition for a polysiloxane hard coating comprising (A) a vinyl polymer having a hydrolyzable silyl group and/or SiOH group and an organic UV absorbing group bonded to its side chain, and (B) fine silica particles dispersed in an organic solvent, wherein a primer layer formed by coating and curing the primer composition has a coefficient of linear expansion of up to $150\times10^{-6}/°$ C.

[II] A primer composition for a polysiloxane hard coating comprising (D) an organic/inorganic composite product obtained by reacting (A) a vinyl polymer having a hydrolyzable silyl group and/or SiOH group and an organic UV absorbing group bonded to its side chain, and (B) fine silica particles dispersed in an organic solvent, wherein a primer layer formed by coating and curing the primer composition has a coefficient of linear expansion of up to $150\times10^{-6}/°$ C.

[III] The primer composition according to the above [I] or [II] wherein the vinyl polymer having a hydrolyzable silyl group and/or SiOH group and an organic UV absorbing group bonded to its side chain (A) is a vinyl polymer produced by copolymerizing monomer components comprising (a) a vinyl monomer having a hydrolyzable silyl group and/or SiOH group bonded thereto through C—Si bond, (b) a vinyl monomer having an organic UV absorbing group, and (c) a copolymerizable monomer other than (a) and (b).

[IV] The primer composition according to any one of the above [I] to [III] wherein the fine silica particles (B) dispersed in the organic solvent has a primary particle size of 0.5 to 100 nm.

[V] The primer composition according to any one of the above [I] to [IV] wherein the primer composition further comprises (C) a hydrolyzable silicon compound and/or its hydrolyzation and condensation product.

[VI] The primer composition according to any one of the above [V] wherein the hydrolyzable silicon compound and/or its hydrolyzation and condensation product (C) is a compound having nitrogen atom and alkoxysilyl group in its molecule.

[VII] A coated article comprising a substrate, a coating of the primer composition of any one of the above [I] to [VI] formed on the substrate, and a polysiloxane hard coating formed on the primer coating.

[VIII] The coated article according to the above [VII] wherein the polysiloxane hard coating is formed from a hard coating composition comprising a hydrolysate or a co-hydrolysate of at least one organoxysilane represented by the formula (1):

$$(R^7)_m Si(OR^8)_{4-m} \qquad (1)$$

wherein $R^7$ is an organic group containing 1 to 10 carbon atoms, $R^8$ is hydrogen atom or a monovalent organic group, and m is 0, 1, or 2; and fine silica particles.

Effects of the Invention

The primer composition of the present invention has a dramatically improved light resistance since this primer composition can retain the organic UV absorber at a large amount in the coating. Gradual loss of the organic UV absorbent is also prevented since the organic UV absorbent is fixedly secured in the coating by siloxane crosslinking. In addition, since the organic-inorganic complex formed by the siloxane crosslinking of the vinyl polymer and the fine silica particles is a binder having a reduced coefficient of linear expansion and excellent weatherability, the resulting UV absorbing protective coating will have excellent water resistance, solvent resistance, and light resistance. When this primer composition is coated and cured on an article having an inferior weatherability, the article will be provided with an improved resistance to coloring and degradation as well as favorable weatherability.

An article formed from a plastic resin, and in particular, a polycarbonate resin having a coating formed by using the primer composition of the present invention has excellent transparency and weatherability. When the primer coating is overlaid with a polysiloxane hard coating, the article will also be provided with scratch resistance and chemical resistance. Accordingly, such article is well adapted for use in outdoors, for example, for windows and windshields of automobiles, aircrafts, and other carriers, and sound-insulating walls of highways.

DESCRIPTION OF THE PREFERRED EMBODIMENTS

The critical components of the primer composition of the present invention are (A) a vinyl polymer having a hydrolyzable silyl group and/or SiOH group and an organic UV absorbing group bonded to its side chain, and (B) fine silica particles dispersed in an organic solvent.

The component (A), namely, the vinyl polymer having a hydrolyzable silyl group and/or SiOH group and an organic UV absorbing group bonded to its side chain is preferably the one having the hydrolyzable silyl group and/or SiOH group bonded to the vinyl polymer backbone by Si—C bond. Preferably, the organic UV absorbing group is also bonded to the vinyl polymer backbone. Such polymer may be obtained by copolymerizing monomer components: (a) a vinyl monomer having a hydrolyzable silyl group and/or SiOH group bonded thereto by C—Si bond, (b) a vinyl monomer having an organic UV absorbing group, and (c) a copolymerizable monomer other than (a) and (b).

The vinyl monomer having a hydrolyzable silyl group and/or SiOH group bonded thereto by C—Si bond (a) may be any vinyl monomer as long as it has one polymerizable vinyl functional group per molecule and at least one hydrolyzable silyl group and/or SiOH group per molecule.

The polymerizable vinyl functional group may be, for example, an organic group containing 2 to 12 carbon atoms containing vinyl group, vinyloxy group, (meth)acryloxy group, or (α-methyl)styryl group, and exemplary such organic groups include vinyl group, 5-hexenyl group, 9-decenyl group, vinyloxymethyl group, 3-vinyloxypropyl group, (meth)acryloxymethyl group, 3-(meth)acryloxypropyl group, 11-(meth)acryloxyundecyl group, vinylphenyl group (styryl group), isopropenylphenyl group (α-methylstyryl group), and vinylphenylmethyl group (vinylbenzyl group). Among these, use of (meth)acryloxypropyl group is preferably in view of the reactivity and availability.

Examples of the hydrolyzable group include alkoxy groups such as methoxy group, ethoxy group, propoxy group, isopropoxy group, butoxy group, isobutoxy group, sec-butoxy group, and tert-butoxy group; acyloxy groups such as phenoxy group and acetyloxy group; oxime groups such as butanoxime group; amino groups such as amino group and methylamino group; and halogen groups such as chloro group. In view of controlling the hydrolyzation and availability, the preferred are alkoxy groups such a methoxy group and ethoxy group.

The substituents other than those as described above include alkyl groups such as methyl group, ethyl group, propyl group, hexyl group, and decyl group; and phenyl groups. Among these, the preferred is methyl group in view of its availability.

Examples of the vinyl monomer having a hydrolyzable silyl group and/or SiOH group bonded thereto by C—Si bond (a) include:
methacryloxymethyltrimethoxysilane,
methacryloxypropyltrimethoxysilane,
methacryloxyundecyltrimethoxysilane,
methacryloxypropylmethyldimethoxysilane,
methacryloxypropyldimethylmethoxysilane,
methacryloxypropyltriethoxysilane,
acryloxypropyltrimethoxysilane,
acryloxypropylmethyldimethoxysilane,
acryloxypropyldimethylmethoxysilane,
acryloxypropyltriethoxysilane,
acryloxymethyltrimethoxysilane,
acryloxyundecyltrimethoxysilane,
vinyltrimethoxysilane, vinyltriethoxysilane,
vinylmethyldimethoxysilane, allyltrimethoxysilane,
styryltrimethoxysilane, styrylmethyldimethoxysilane, and styryltriethoxysilane.

In view of availability, handling convenience, crosslink density, and reactivity, the preferred among these are methacryloxypropyltrimethoxysilane, methacryloxypropylmethyldimethoxysilane, methacryloxypropyldimethylmethoxysilane, acryloxypropyltrimethoxysilane, and acryloxypropylmethyldimethoxysilane.

The vinyl monomer having a hydrolyzable silyl group and/or SiOH group bonded thereto by C—Si bond (a) may be used at an amount of 1 to 50% by weight, and in particular, at 3 to 40% by weight of the copolymer composition. When incorporated at less than 1% by weight, formation of the siloxane network by the crosslinking of the vinyl copolymer or the crosslinking of the vinyl polymer with the fine silica particles may become insufficient, and the coefficient of linear expansion of the coating may not be sufficiently reduced to realize the improvement of the heat resistance and durability of the coating. On the other hand, incorporation in excess of 50% by weight may result in an unduly high hardness of the coating because of the excessively high crosslinking density, and this may result in the insufficient adhesion of the coating. The excessive incorporation of this monomer may also result in the insufficient reaction of the hydrolyzable group or the SiOH group, and the remaining such group may subsequently undergo gradual crosslinking and cause cracks in the coating.

Next, the vinyl monomer having an organic UV absorbing group (b) is described. Any compound may be used for the vinyl monomer having an organic UV absorbing group (b) as long as it has a UV absorbing group and a polymerizable vinyl group in its molecule.

Examples of such vinyl monomer containing an organic UV absorbing group include (meth)acrylic monomers having a UV absorbing group in the molecule, for example, a benzotriazole compound represented by the following general formula (2) and a benzophenone compound represented by the following general formula (3):

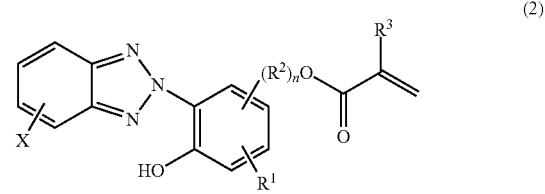

Wherein X represents hydrogen atom or chlorine atom; $R^1$ represents hydrogen atom, methyl group, or a tertiary alkyl group containing 4 to 8 carbon atoms; $R^2$ represents a straight chain or branched alkylene group containing 2 to 10 carbon atoms; $R^3$ represents hydrogen atom or methyl group; and n represents 0 or 1; and

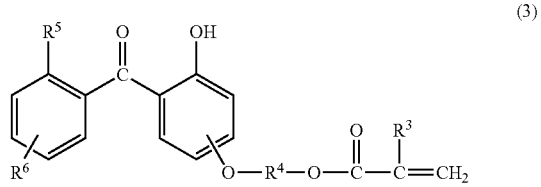

(3)

wherein $R^3$ is as defined above; $R^4$ is an optionally substituted straight chain or branched alkylene group containing 2 to 10 carbon atoms; $R^5$ represents hydrogen atom or hydroxy group; $R^6$ represents hydrogen atom, hydroxy group, or an alkoxy group containing 1 to 6 carbon atoms.

In the general formula (2), examples of the tertiary alkyl group containing 4 to 8 carbon atoms represented by $R^1$ include tert-butyl group, tert-pentyl group, tert-hexyl group, tert-heptyl group, tert-octyl group, and di-tert-octyl group.

Examples of the straight chain or branched alkylene group containing 2 to 10 carbon atoms represented by $R^2$ include ethylene group, trimethylene group, propylene group, tetramethylene group, 1,1-dimethyl tetramethylene group, butylene group, octylene group, and decylene group.

In the general formula (3), examples the straight chain or branched alkylene group containing 2 to 10 carbon atoms represented by $R^4$ include the groups as defined above for the $R^2$ and any of such groups having hydrogen atoms partly substituted with a halogen atom. Examples of the alkoxy group represented by $R^6$ include methoxy group, ethoxy group, propoxy group, and butoxy group.

Exemplary benzotriazole compounds represented by the general formula (2) include
2-(2'-hydroxy-5'-(meth)acryloxy phenyl)-2H-benzotriazole,
2-(2'-hydroxy-3'-tert-butyl-5'-(meth)acryloxymethyl phenyl)-2H-benzotriazole,
2-[2'-hydroxy-5'-(2-(meth)acryloxyethyl)phenyl]-2H-benzotriazole,
2-[2'-hydroxy-3'-tert-butyl-5'-(2-(meth)acryloxyethyl)phenyl]-5-chloro-2H-benzotriazole, and
2-[2'-hydroxy-3'-methyl-5'-(8-(meth)acryloxy octyl)phenyl]-2H-benzotriazole.

Exemplary benzophenone compounds represented by the general formula (3) include
2-hydroxy-4-(2-(meth)acryloxyethoxy)benzophenone,
2-hydroxy-4-(4-(meth)acryloxy butoxy)benzophenone,
2,2'-dihydroxy-4-(2-(meth)acryloxyethoxy)benzophenone,
2,4-dihydroxy-4'-(2-(meth)acryloxyethoxy)benzophenone,
2,2',4-trihydroxy-4'-(2-(meth)acryloxyethoxy)benzophenone,
2-hydroxy-4-(3-(meth)acryloxy-2-hydroxypropoxy)benzophenone, and
2-hydroxy-4-(3-(meth)acryloxy-1-hydroxypropoxy)benzophenone.

Among such UV absorbing vinyl monomers, the preferred are benzotriazole compounds represented by the formula (2), and the most preferred is 2-[2'-hydroxy-5'-(2-(meth)acryloxyethyl)phenyl]-2H-benzotriazole.

These UV absorbing vinyl monomer may be used alone or in combination of two or more.

The vinyl monomer having an organic UV absorbing group (b) is preferably used at an amount of 1 to 30% by weight, and in particular, at 3 to 25% by weight in the copolymer composition. Incorporation at less than 1% by weight will result in the insufficient weatherability, whereas incorporation in excess of 30% by weight will result in the insufficient adhesion of the coating as well as inferior outer appearance such as whitening.

The monomer (c) other than the monomers (a) and (b) which is copolymerizable with the monomers (a) and (b) is not particularly limited as long as is a copolymerizable monomer. Examples of such monomer (c), however include (meth)acryl monomers having cyclic hindered amine structure, (meth)acrylates, (meth)acrylonitriles, (meth)acrylamides, alkyl vinyl ethers, alkyl vinyl esters, styrenes, and derivatives thereof.

Examples of the (meth)acryl monomer having cyclic hindered amine structure include 2,2,6,6-tetramethyl-4-piperidinyl methacrylate and 1,2,2,6,6-pentamethyl-4-piperidinyl methacrylate. These light stabilizers may be used either alone or in combination of two or more.

Examples of the (meth)acrylate and its derivative include (meth)acrylates of a monohydric alcohol such as methyl (meth)acrylate, ethyl(meth)acrylate, n-propyl(meth)acrylate, isopropyl(meth)acrylate, n-butyl(meth)acrylate, isobutyl (meth)acrylate, sec-butyl(meth)acrylate, t-butyl(meth)acrylate, n-pentyl(meth)acrylate, isopentyl(meth)acrylate, n-hexyl(meth)acrylate, isohexyl(meth)acrylate, n-heptyl (meth)acrylate, isoheptyl(meth)acrylate, 2-ethylhexyl(meth) acrylate, n-octyl(meth)acrylate, isooctyl(meth)acrylate, n-nonyl(meth)acrylate, isononyl(meth)acrylate, n-decyl (meth)acrylate, isodecyl(meth)acrylate, n-undecyl(meth) acrylate, n-dodecyl(meth)acrylate, lauryl(meth)acrylate, palmityl(meth)acrylate, stearyl(meth)acrylate, cyclohexyl (meth)acrylate, 4-methylcyclohexyl(meth)acrylate, 4-t-butylcyclohexyl(meth)acrylate, isobornyl(meth)acrylate, dicyclopentanyl(meth)acrylate, dicyclopentenyloxyethyl(meth) acrylate, and benzyl(meth)acrylate;

(meth)acrylate esters of an alkoxy(poly)alkylene glycol such as 2-methoxyethyl(meth)acrylate, 2-methoxypropyl (meth)acrylate, 3-methoxypropyl(meth)acrylate, 2-methoxybutyl(meth)acrylate, 3-methoxybutyl(meth)acrylate, 4-methoxybutyl(meth)acrylate, methoxypolyethylene glycol (meth)acrylate (the number of ethylene glycol units being, for example, 2 to 20), and methoxypolypropylene glycol (meth) acrylate (the number of propylene glycol units being, for example, 2 to 20);

mono(meth)acrylates of a polyhydric alcohol such as 2-hydroxyethyl(meth)acrylate, 2-hydroxypropyl(meth)acrylate, 3-hydroxypropyl(meth)acrylate, 2-hydroxy butyl(meth) acrylate, 3-hydroxybutyl(meth)acrylate, 4-hydroxybutyl (meth)acrylate, glycerin mono(meth)acrylate, pentaerythritol mono(meth)acrylate, polyethylene glycol mono(meth) acrylate (the number of ethylene glycol units being, for example, 2 to 20)), and polypropylene glycol mono(meth) acrylate (the number of propylene glycol units being, for example, 2 to 20);

poly(meth)acrylates of a polyhydric alcohol such as ethylene glycol di(meth)acrylate, propylene glycol di(meth)acrylate, butylene glycol di(meth)acrylate, glycerin di(meth)acrylate, glycerin tri(meth)acrylate, pentaerythritol di(meth) acrylate, pentaerythritol tetra(meth)acrylate, 1,4-cyclohexanediol di(meth)acrylate, polyethylene glycol di(meth)acrylate (the number of ethylene glycol units being, for example, 2 to 20), and polypropylene glycol di(meth) acrylate (the number of propylene glycol units being, for example, 2 to 20);

(poly)esters of a non-polymerizable polybasic acid and a hydroxyalkyl(meth)acrylate such as mono[2-(meth)acryloyloxyethyl]succinate, di[2-(meth)acryloyloxyethyl]succinate, mono[2-(meth)acryloyloxyethyl]adipate, di[2-(meth)acryloyloxyethyl]adipate, mono[2-(meth)acryloyloxyethyl]phythalate, and di[2-(meth)acryloyloxyethyl]phythalate;

amino group-containing (meth)acrylates such as 2-aminoethyl(meth)acrylate, 2-(N-methylamino)ethyl(meth)acrylate, 2-(N,N-dimethylamino)ethyl(meth)acrylate, 2-(N-ethylamino)ethyl(meth)acrylate, 2-(N,N-diethylamino)ethyl(meth)acrylate, 3-(N,N-dimethylamino)propyl(meth)acrylate, and 4-(N,N-dimethylamino)butyl(meth)acrylate; and epoxy group-containing (meth)acrylates such as glycidyl (meth)acrylate.

Examples of the (meth)acrylonitrile derivatives include α-chloroacrylonitrile, α-chloromethyl acrylonitrile, α-trifluoromethyl acrylonitrile, α-methoxy acrylonitrile, α-ethoxy acrylonitrile, and vinylidene cyanide.

Examples of the (meth)acrylamide derivatives include N-methyl(meth)acrylamide, N,N-dimethyl(meth)acrylamide, N-ethyl(meth)acrylamide, N,N-diethyl(meth)acrylamide, N-methoxy(meth)acrylamide, N,N-dimethoxy(meth)acrylamide, N-ethoxy(meth)acrylamide, N,N-diethoxy(meth)acrylamide, diacetone(meth)acrylamide, N-methylol(meth)acrylamide, N-(2-hydroxyethyl)(meth)acrylamide, N,N-dimethylamino methyl(meth)acrylamide, N-(2-dimethylamino)ethyl(meth)acrylamide, N,N'-methylene bis(meth)acrylamide, and N,N'-ethylene bis(meth)acrylamide.

Examples of the alkyl vinyl ethers include methyl vinyl ether, ethyl vinyl ether, butyl vinyl ether, and hexyl vinyl ether.

Examples of the alkyl vinyl ester include vinyl formate, vinyl acetate, vinyl acrylate, vinyl butyrate, caproic acid vinyl, and vinyl stearate.

Examples of the styrene and its derivative include styrene, α-methylstyrene, and vinyl toluene.

Among such monomers, the preferred are (meth)acrylate esters, and the most preferred are methyl(meth)acrylate, ethyl(meth)acrylate, isopropyl(meth)acrylate, n-butyl(meth)acrylate, isobutyl(meth)acrylate, n-hexyl(meth)acrylate, 2-ethylhexyl(meth)acrylate, isononyl(meth)acrylate, lauryl(meth)acrylate, cyclohexyl(meth)acrylate, 4-methylcyclohexyl(meth)acrylate, 4-t-butylcyclohexyl(meth)acrylate, isobornyl(meth)acrylate, dicyclopentanyl(meth)acrylate, and dicyclopentenyloxyethyl(meth)acrylate.

The copolymerizable monomer (c) other than the monomers (a) and (b) may be any of the monomers as described above which may be used alone or in combination of two or more.

The copolymerizable monomer (c) other than the monomers (a) and (b) may be used at an amount in the range of 20 to 98% by weight, and in particular, at 35 to 94% by weight of the copolymer composition. Excessive incorporation of the monomer (c) may invite insufficient crosslinking of the resulting vinyl copolymer or insufficient crosslinking between the vinyl copolymer and the fine silica particles, and in such a case, reduction in the coefficient of linear expansion of the coating will be insufficient, and heat resistance and durability as well as weatherability of the coating will not be sufficiently improved. On the other hand, incorporation of the monomer (c) at an excessively small amount may invite unduly high crosslinking density, which may invite insufficient adhesion as well as failure in the outer appearance such as whitening of the coating.

In producing the vinyl polymer (A), the copolymerization of (a) the vinyl monomer having a hydrolyzable silyl group and/or SiOH group bonded thereto by C—Si bond; (b) the vinyl monomer having an organic UV absorbing group; and (c) the copolymerizable monomer other than (a) and (b) may be readily accomplished by adding a radical polymerization initiator selected from peroxides such as dicumyl peroxide and benzoyl peroxide and azo compounds such as azobisisobutyronitrile to the solution of such monomers, and allowing the reaction to proceed at an elevated temperature of 50 to 150° C., and in particular, at 70 to 120° C. for 1 to 10 hours, and in particular, for 3 to 8 hours.

This vinyl polymer may preferably have a weight average molecular weight as determined by gel permeation chromatography (GPC) in terms of polystyrene of 1,000 to 300,000, and in particular, 5,000 to 250,000. The molecular weight in excess of such range may invite failure of the synthesis as well as handling inconvenience due to the unduly increased viscosity. An excessively low molecular weight may invite inferior outer appearance such as whitening or insufficiency of the adhesion, durability, and weatherability.

Next, the fine silica particles dispersed in an organic solvent (B) which is a critical component of the primer composition of the present invention is described.

The fine silica particles (B) is not particularly limited as long as it is dispersible in the organic solvent, and the primer layer formed by the curing of the primer composition has a coefficient of linear expansion of up to $150 \times 10^{-6}/°$ C. Since the fine silica particles (B) has SiOH group on the particle surface, an organic-inorganic composite is formed by the siloxane crosslinking between this SiOH group and the hydrolyzable silyl group and/or the SiOH group of the vinyl polymer component (A). As a consequence, the coefficient of linear expansion reduces to the level of $150 \times 10^{-6}/°$ C. or less.

Examples of the organic solvent used for preparing the dispersion of the fine silica particles in an organic solvent (B) include methanol, ethanol, isopropanol, n-butanol, ethylene glycol, ethyl cellosolve, butyl cellosolve, propylene glycol monomethyl ether, propylene glycol monomethyl ether acetate, dimethylformamide, dimethyl acetamide, methyl ethyl ketone, methyl isobutyl ketone, and xylene/n-butanol mixture. Among these, the preferred are ethylene glycol, ethyl cellosolve, butyl cellosolve, propylene glycol monomethyl ether, propylene glycol monomethyl ether acetate, methyl ethyl ketone, and methyl isobutyl ketone in view of solubility of the vinyl polymer component (A).

In view of the dispersibility and transparency in the primer coating after curing, the fine silica particles (B) may preferably have a primary particle size of 0.5 to 100 nm, and more preferably 2 to 50 nm. Use of a fine silica particles with the primary particle size in excess of 100 nm may result in the insufficient dispersion stability of the fine silica particles (B) in the composition or in the drastic loss of transparency of the coating after its curing.

The fine silica particles dispersed in an organic solvent (B) is preferably a colloidal silica dispersed in an organic solvent, which is referred to as an organosilica sol. Exemplary such organosilica sols include silica sol dispersed in ethylene glycol, silica sol dispersed in ethylene glycol mono-n-propyl ether, silica sol dispersed in ethyl cellosolve, silica sol dispersed in butyl cellosolve, silica sol dispersed in propylene glycol monomethyl ether, silica sol dispersed in propylene glycol monomethyl ether acetate, silica sol dispersed in methyl ethyl ketone, and silica sol dispersed in methyl isobutyl ketone.

These fine silica particles dispersed in an organic solvent (B) may be used alone or in combination of two or more.

The colloidal silica dispersion in an organic solvent used in the present invention may be a commercially available product such as those employed in the Examples 1 to 4, and examples include PMA-ST, MEK-ST, and MIBK-ST (manufactured by Nissan Chemical Industries, Ltd.), IPA-ST-L, IPA-ST-MS, EG-ST-ZL, DMAC-ST-ZL, and XBA-ST (also manufactured by Nissan Chemical Industries, Ltd.), and OSCAL1132, 1332, 1532, 1722, and ELCOM ST-1003SIV (manufactured by catalyst Kasei Kogyo).

In the primer composition of the present invention, (A) the vinyl polymer having a hydrolyzable silyl group and/or SiOH group and an organic UV absorbing group bonded to its side chain and (B) the fine silica particles dispersed in an organic solvent are incorporated so that solid content of the fine silica particles (B) is 0.1 to 100 parts by weight, and more preferably 1 to 50 parts by weight in relation to 100 parts by weight of the resin component in the vinyl polymer (A). When the fine silica particles (B) is incorporated at an amount in excess of 100 parts by weight, the primer composition of the present invention will exhibit an unduly high crosslinking density and the coating will be excessively hard, and the coating may experience insufficient adhesion with the underlying substrate or with the overlying polysiloxane coating. When incorporated at an amount less than 0.1 parts by weight, the resulting coating will have an unduly low crosslinking density, and the coefficient of linear expansion of the coating will not be up to $150 \times 10^{-6}/°$ C., and the expected adhesion and crack resistance may not be realized.

The inventive primer composition may comprise (D) an organic/inorganic composite product obtained by previously reacting (A) the vinyl polymer having a hydrolyzable silyl group and/or SiOH group and an organic UV absorbing group bonded to its side chain and (B) the fine silica particles dispersed in an organic solvent. The incorporation of the organic/inorganic composite product previously formed by the reaction of the above components (A) and (B) can bring out a rapid cure of the inventive primer composition and a lower linear expansion coefficient of the primer layer.

The reaction between (A) the vinyl polymer having a hydrolyzable silyl group and/or SiOH group and an organic UV absorbing group bonded to its side chain and (B) the fine silica particles dispersed in an organic solvent is conducted under heating, i.e., preferably at 30 to 120° C., especially 40 to 80° C. for 0.5 to 12 hours, especially 1 to 10 hours, thereby forming (D) the organic/inorganic composite product. With respect to the amounts of components (A) and (B), the solid matter of component (B) is preferably used in an amount of 0.1 to 100 parts by weight, more preferably 1 to 50 parts by weight per 100 parts by weight of component (A). In this case, the reaction is sufficient so long as a part of component (B) is reacted with a part of component (A), even if component (B) is completely reacted with component (A). If the amount of component (A) is small (i.e., the amount of component (B) is large), the resulting product would have too high crosslinking density, whereby the adhesion to the substrate or the polysiloxane film formed on the surface of the primer layer would be lowered and the gelation of the resulting primer composition would be easily caused. If the amount of component (A) is large, i.e., the amount of component (B) is small, the resulting primer composition would has too low crosslinking density, whereby the primer layer would not have a linear expansion coefficient of $150 \times 10^{-6}/°$ C. or less and good adhesion and crack resistance are not exerted.

As the reaction progresses, the gel fraction of the primer layer formed from the inventive primer composition would become high and the linear expansion coefficient would be lowered.

The primer composition of the present invention may also contain (C) a hydrolyzable silicon compound and/or its hydrolyzation and condensation product in addition to the components as described above. The hydrolyzable silicon compound is preferably an organosilicon compound containing nitrogen atom and an alkoxy silyl group in the molecule.

The organosilicon compound containing nitrogen atom and an alkoxy silyl group in the molecule used for the component (C) is described. When such an organosilicon compound containing nitrogen atom and an alkoxy silyl group in the molecule (C) is incorporated in the composition, the coating of the primer composition will exhibit good water resistance simultaneously with the good adhesion. In addition, the coating will be compact since the organosilicon compound crosslinks with the hydrolyzable silyl group and/or the SiOH group of the vinyl polymer having a hydrolyzable silyl group and/or SiOH group and an organic UV absorbing group bonded to its side chain (A), and since the nitrogen atom in the organosilicon compound (C) accelerates such crosslinking, the amount of the alkoxy silyl group remaining in the coating will be reduced, and cracks caused by the subsequent gradual crosslinking will be reduced. Use of the component (C) also facilitates efficient securing of the UV absorbent (B) and the optionally added light stabilizer in the coating of the primer composition.

The organosilicon compounds containing nitrogen atom and an alkoxysilyl group in the molecule (C) is preferably a compound containing at least one nitrogen atom and at least one alkoxysilyl group in one molecule, and more preferably a compound containing at least one nitrogen atom and at least two alkoxysilyl groups in one molecule. Preferable examples of such compound include an amino group-containing alkoxysilane, an amino group-containing di(alkoxysilane), an amide group-containing alkoxysilane, a compound produced by amidating the reaction product of an amino group-containing alkoxysilane, an epoxy group-containing alkoxysilane, and a silylating agent, the reaction product of an amino group-containing alkoxysilane and a dicarboxylic anhydride, the reaction product of an amino group-containing alkoxysilane and a (poly)(meth)acryl compound, the reaction product of an amino group-containing alkoxysilane and an (meth)acryl group-containing alkoxysilane, the reaction product of a polyamine compound and a (meth)acryl group-containing alkoxysilane, the compound produced by amidating the reaction product of an amino group-containing alkoxysilane and a polyisocyante compound, and an isocyanurate ring-containing (poly)silane compound. The more preferred are a compound prepared by amidating the reaction product of an amino group-containing alkoxysilane, an epoxy group-containing alkoxysilane, and a silylating agent; and the reaction product of an amino group-containing alkoxysilane and a dicarboxylic anhydride.

Examples of the compounds used for such components are as described below. Examples of the amino group-containing alkoxysilane include 3-aminopropyltrimethoxysilane, 3-aminopropyltriethoxysilane, 3-aminopropylmethyldimethoxysilane, 3-aminopropylmethyldiethoxysilane, N-(2-aminoethyl)-3-aminopropyltrimethoxysilane, N-(2-aminoethyl)-3-aminopropyltriethoxysilane, N-(2-aminoethyl)-3-aminopropylmethyldimethoxysilane, N-(2-aminoethyl)-3-aminopropylmethyldiethoxysilane, 3-(trimethoxysilylpropyl)aminopropyltrimethoxysilane, 3-(triethoxysilylpropyl)aminopropyltriethoxysilane, 2-(trimethoxysilylpropyl)aminoethyl-3-aminopropyltrimethoxysilane, 2-(triethoxysilylpropyl)aminoethyl-3-aminopropyltriethoxysilane, N-phenyl-3-aminopropyltrimethoxysilane, N-vinylbenzyl-3-aminopropyltriethoxysilane, and hydrochloride thereof.

Examples of the amino group-containing di(alkoxysilane) include bis(trimethoxysilylpropyl)amine.

Examples of the amide group-containing alkoxysilane include ureidopropyltrimethoxysilane, ureidopropyltriethoxysilane, ureidopropylmethyldimethoxysilane, and ureidopropylmethyldiethoxysilane.

Examples of the dicarboxylic anhydride include maleic anhydride, phthalic anhydride, tetrahydrophthalic anhydride, hexahydrophthalic anhydride, methyl-substituted tetrahydrophthalic anhydride, methyl-substituted hexahydrophthalic anhydride, 3,6-endomethylenetetrahydrophthalic anhydride, and methyl-substituted-3,6-endomethylenetetrahydrophthalic anhydride.

Examples of the (poly)(meth)acryl compounds include alkyl methacrylates such as methyl methacrylate, butyl methacrylate, and 2-ethylhexyl methacrylate; alkyl acrylates such as methyl acrylate, ethyl acrylate, butyl acrylate; and acrylamide, acrylonitrile, and ethylene glycol dimethacrylate.

Examples of the polyamine compound include ethylenediamine, diethylenetriamine, triethylenetriamine, tetraethylenepentamine, and piperazine.

Examples of the polyisocyante compound include toluene diisocyanate, diphenylmethanediisocyanate, hexamethylene diisocyanate, 2,2,4-trimethylhexamethylene diisocyanate, 2,4,4-trimethylhexamethylene diisocyanate, p-phenylene diisocyanate-4,4'-dicyclohexyl methane diisocyanate, 3,3'-dimethyl diphenyl-4,4'-diisocyanate, dianisidine diisocyanate, m-xylene diisocyanate, isophorone diisocyanate, 1,5-diisocyanate, trans-1,4-cyclohexyl diisocyanate, diisocyanate, dimethyltriphenylmethane tetraisocyanate, triphenylmethane triisocyanate, and tris(isocyanate phenyl)thiophosphate.

Examples of the (meth)acryl group-containing alkoxysilane include those as mentioned above for the acrylic monomer which contains an alkoxysilyl group.

Examples of the isocyanurate ring-containing silane include tris(trimethoxysilylpropyl)isocyanurate, bis(trimethoxysilylpropyl)allyl isocyanurate, and tris(triethoxysilylpropyl)isocyanurate.

The compound prepared by amidating the reaction product of an amino group-containing alkoxysilane, an epoxy group-containing alkoxysilane, and a silylating agent can be prepared by the procedure as described below. The amino group-containing alkoxysilane used in such process may be selected form those as mentioned above, and the preferred are N-(2-aminoethyl)-3-aminopropyltrimethoxysilane and N-(2-aminoethyl)-3-aminopropylmethyldimethoxysilane in view of the adhesion and handling convenience. While the epoxy group-containing alkoxysilane is not particularly limited, the preferred are γ-glycidoxypropyltrimethoxysilane, γ-glycidoxypropylmethyldimethoxysilane, and β-(3,4-epoxycyclohexyl)ethylmethyldimethoxysilane in view of the reactivity and the handling convenience. Exemplary silylating agents used include hexamethyldisilazane, N,N'-bis(trimethylsilyl)formamide, and N,N'-bis(trimethylsilyl)urea, and the silylating agent is incorporated for the purpose of protecting the OH group generated by the reaction between the amino group-containing alkoxysilane and the epoxy group-containing alkoxysilane to thereby prevent the reaction between the OH group and the alkoxysilyl group and gradual change of the reaction product.

The reaction of the amino group-containing alkoxysilane, the epoxy group-containing alkoxysilane, and the silylating agent may be accomplished by dropwise addition of the epoxy group-containing alkoxysilane to the mixture of the amino group-containing alkoxysilane and the silylating agent followed by the heating of the mixture. Alternatively, the reaction may be accomplished by adding the silylating agent to the reaction mixture of the amino group-containing alkoxysilane and the epoxy group-containing alkoxysilane. The reaction conditions may be adequately selected, and preferably, the reaction may be accomplished at 50 to 150° C., and in particular, at 80 to 140° C. for 1 to 12 hours, and in particular, for 3 to 8 hours.

In this reaction, the amino group-containing alkoxysilane and the epoxy group-containing alkoxysilane may be incorporated so that the molar ratio of the epoxy group to the amino group (=N—H) is in the range of 0.3 to 1.2. When this molar ratio is less than 0.3, number of the alkoxy group involved in the crosslinking per molecule will be too small and the resulting composition will suffer from insufficient curability, and the crosslinking will not be sufficiently spread throughout the molecule and adhesion will be insufficient due to the weak surface bonding. When the molar ratio is in excess of 1.2, there will be little =N—H group which can be amidated by the amidation as described below, and water resistant adhesion may become insufficient.

As described above, this component is prepared by amidating such reaction product. This amidation is accomplished by the reaction with a acid halide, acid anhydride, and isopropenyl acid ester of a carboxylic acid such as acetic acid chloride, acetic acid bromide, propionic acid chloride, acetic anhydride, isopropenyl acetate, and benzoyl chloride.

The reaction product of the amino group-containing alkoxysilane and the dicarboxylic anhydride may be produced by the procedure as described below. The amino group-containing alkoxysilane used in this procedure may be those as mentioned above, and the preferred are 3-aminopropyltrimethoxysilane, 3-aminopropyltriethoxysilane, and 3-aminopropylmethyldiethoxysilane in view of the adhesion property and safety.

Examples of the dicarboxylic anhydride include those as described above. However, the preferred are tetrahydrophthalic anhydride, hexahydrophthalic anhydride, methyl-substituted tetrahydrophthalic anhydride, methyl-substituted hexahydrophthalic anhydride, 3,6-endomethylenetetrahydrophthalic anhydride, and methyl-substituted 3,6-endomethylenetetrahydrophthalic anhydride in view of the adhesion properties and stability.

The reaction between the amino group-containing alkoxysilane and the dicarboxylic anhydride may be accomplished by dropwise addition of the amino group-containing alkoxysilane to the dicarboxylic anhydride. Alternatively, the reaction may be accomplished by dropwise addition of the dicarboxylic anhydride to the amino group-containing alkoxysilane. The reaction conditions used may be adequately selected, and preferably, the reaction is conducted at 0 to 150° C., and in particular, at 20 to 120° C. for 1 to 12 hours, and in particular, for 2 to 8 hours.

In this reaction, the amino group-containing alkoxysilane and the dicarboxylic anhydride may be incorporated so that the molar ratio of the amino group (—NH$_2$) to the dicarboxylic anhydride is in the range of 0.3 to 1.8. When this molar ratio of less than 0.3, number of the alkoxy group involved in the crosslinking per molecule will be too small and the resulting composition will suffer from insufficient curability and insufficient adhesion. When the molar ratio is in excess of 1.8, the resulting primer composition may suffer from insufficient storage stability due to the amino group in the amino group-containing alkoxysilane which failed to undergo the reaction.

Next, the component which may be added to the primer composition of the present invention when necessary is described.

The primer composition of the present invention may have added thereto a thermoplastic vinyl resin. The coating formed by such primer composition will be flexible, and resistant to phase change and softening in the change of ambient temperature, and in particular, at a relatively high temperature range. The coating formed by such primer composition will also experience a reduced strain in the interior, and if overcoated, at the boundary between this coating and the overlying layer, and as a consequence, cracks in the overlying layer, for example, organopolysiloxane protective coating will be prevented. The coating formed by such primer composition will also be provided with resistance to heat and water.

This thermoplastic resin may be incorporated at an amount of 0 to 50 parts by weight in relation to 100 parts by weight of the effective components of the primer composition (total of the component (A) and the component (B) in terms of solid content, and this also applies in the following description). When incorporated, this thermoplastic resin is preferably used at 1 to 50 parts by weight, and in particular, at 3 to 45 parts by weight. Incorporation at an amount in excess of 50 parts by weight may result in the decrease of the crosslinking density of the coating, and in the insufficient hardness.

The primer composition of the present invention may also contain a light stabilizer which has at least one cyclic hindered amine structure or hindered phenol structure per molecule. Weatherability can be improved by the addition of such light stabilizer. Preferably, the light stabilizer used is the one having a high solubility in the solvent used in the primer composition, a high compatibility with the primer composition, as well as a low volatility.

Exemplary light stabilizers include 3-dodecyl-1-(2,2,6,6-tetramethyl-4-piperidinyl)pyrrolidine-2,5-dione, N-methyl-3-dodecyl-1-(2,2,6,6-tetramethyl-4-piperidinyl)pyrrolidine-2,5-dione, N-acetyl-3-dodecyl-1-(2,2,6,6-tetramethyl-4-piperidinyl)pyrrolidine-2,5-dione, bis(2,2,6,6-tetramethyl-4-piperidyl)sebacinate, bis(1,2,2,6,6-pentamethyl-4-piperidyl)sebacinate, tetrakis (2,2,6,6-tetramethyl-4-piperidyl)1,2,3,4-butanetetracarboxylate, tetrakis(1,2,2,6,6-pentamethyl-4-piperidyl)1,2,3,4-butanetetracarboxylate; condensate of 1,2,3,4-butanetetracarboxylic acid, 2,2,6,6-tetramethylpiperidinol, and tridecanol; 8-acetyl-3-dodecyl-7,7,9,9-tetramethyl-1,3,8-triazaspiro[4,5]decane-2,4-dione; condensate of 1,2,3,4-butanetetracarboxylic acid, 1,2,6,6-pentamethyl-4-piperidinol, and β,β,β,β'-tetramethyl-3,9-(2,4,8,10-tetraoxaspiro[5,5]undecane)diethanol; condensate of 1,2,3,4-butanetetracarboxylic acid, 2,2,6,6-pentamethyl-4-piperidinol, and β,β,β,β'-tetramethyl-3,9-(2,4,8,10-tetraoxaspiro[5,5]undecane)diethanol. The light stabilizer used may also be the one modified by silylation such as the one disclosed in Japanese Patent Publication No. 61-56187 in view of immobilizing the light stabilizer. Exemplary such light stabilizers include 2,2,6,6-tetramethylpiperidino-4-propyltrimethoxysilane, 2,2,6,6-tetramethylpiperidino-4-propylmethyldimethoxysilane, 2,2,6,6-tetramethylpiperidino-4-propyltriethoxysilane, 2,2,6,6-tetramethylpiperidino-4-propylmethyl diethoxysilane, and their (partial) hydrolysates, which may be used alone or in combination of two or more.

The light stabilizer may be incorporated at an amount of 0 to 10 parts by weight in relation to 100 parts by weight of the effective components in the primer composition. When incorporated, this light stabilizer is preferably used at 1 to 10 parts by weight. Incorporation at an amount of 10 parts by weight may result in the inferior adhesion of the coating.

The primer composition may also contain an organic UV absorbent to the extent that other properties of the composition are not adversely affected. In such a case, the organic UV absorbent used is preferably the one having a high combatibility with the primer composition, and in particular, a derivative of the compound having a hydroxy benzophenone backbone, a benzotriazole backbone, a cyano acrylate backbone, or a triazine backbone, or a polymer such as vinyl polymer having such UV absorbent in its side chain. Examples of such UV absorbent include 2,4-dihydroxy benzophenone, 2,2',4,4',-tetrahydroxy benzophenone, 2-hydroxy-4-methoxy benzophenone, 2-hydroxy-4-methoxy benzophenone-5-sulfonate, 2-hydroxy-4-n-octoxybenzophenone, 2-hydroxy-4-n-dodecyloxybenzophenone, 2-hydroxy-4-n-benzyloxybenzophenone, 2,2'-dihydroxy-4,4'-dimethoxy benzophenone, 2,2'-dihydroxy-4,4'-diethoxy benzophenone, 2,2'-dihydroxy-4,4'-dipropoxy benzophenone, 2,2'-dihydroxy-4,4'-dibutoxy benzophenone, 2,2'-dihydroxy-4-methoxy-4'-propoxy benzophenone, 2,2'-dihydroxy-4-methoxy-4'-butoxy benzophenone, 2,3,4-trihydroxy benzophenone, 2-(2-hydroxy-5-t-methylphenyl)benzotriazole, 2-(2-hydroxy-5-t-octylphenyl)benzotriazole, 2-(2-hydroxy-3,5-di-t-butylphenyl)benzotriazole, ethyl-2-cyano-3,3-diphenyl acrylate, 2-ethylhexyl-2-cyano-3,3-diphenyl acrylate, and 2-(2-hydroxy-4-hexyloxyphenyl)-4,6-diphenyltriazine which may be used alone or in combination of two or more.

The primer composition may also contain a functional fine metal oxide particles to the extent that other properties of the composition are not adversely affected. In such a case, the fine metal oxide particles used are preferably those which are highly compatible with and dispersible in the primer composition allowing the resulting coating to have certain transparency without cloudiness. Examples include titanium oxide, cerium oxide, zinc oxide, tin oxide, zirconium oxide, antimony oxide, tungsten oxide, antimony-containing tin oxide, tin-containing indium oxide, iron oxide, and alumina, which may be used as a single metal oxide, a mixed metal oxide, or a mixture thereof.

The fine metal oxide particles may be incorporated at an amount of 0 to 30 parts by weight in relation to 100 parts by weight of the effective components in the primer composition. When incorporated, the fine metal oxide particles are preferably used at an amount of 1 to 30 parts by weight. Incorporation at an amount in excess of 30 parts by weight may result in the loss of transparency of the coating.

The primer composition is used by diluting with a solvent to an adequate degree. Exemplary solvents include diacetone alcohol, propylene glycol monomethyl ether, ethylene glycol monomethyl ether, propylene glycol monoethyl ether, ethylene glycol monoethyl ether, isobutyl alcohol, isopropyl alcohol, n-butyl alcohol, n-propyl alcohol, acetone, methyl ethyl ketone, methyl isobutyl ketone, acetyl acetone, ethyl acetate, butyl acetate, xylene, and toluene. The primer composition is generally used after diluting the composition with such solvent so that the concentration of the effective components of the primer composition is preferably in the range of 5 to 20% by weight.

If desired, an effective amount of fluorine or silicone surfactant such as Fluorad FC-4430 (manufactured by Sumitomo 3M) and KP-341 (manufactured by Shin-Etsu Chemical Co., Ltd.) may be added to the composition for smoothening of the coating. Also, a catalytic amount of a crosslink curing catalyst such as Neostann U-810 (manufactured by Nitto Kasei Co., Ltd.), B-7 (manufactured by Nippon Soda Co., Ltd.), and Organotics ZA-60 and TC-200 (manufactured by Matumoto Seityaku Co., Ltd.) may be added to accelerate curing of the coating.

The solution of the primer composition is coated on the surface of the substrate such as a plastic film which has been preliminarily cleaned, and the solvent used for the dilution was evaporated at room temperature or at an elevated temperature to form a coating having a thickness of 0.5 to 20 μm, and preferably, 1 to 15 μm. When the coating is less than 0.5 μm, the desired weatherability is not realized, and a coating in excess of 20 μm results in the loss of coating workability, and also, adverse effects on the mechanical and optical properties inherent to the resin substrate.

When the solvent is evaporated by heating, the temperature is preferably elevated to a temperature in the range of room temperature to the heat resistant temperature of the substrate, and in particular, to 50 to 140° C. for 1 minute to 3 hours, and in particular, for 5 minutes to 2 hours.

The method used in the coating is not particularly limited. Exemplary methods include roll coating, dip coating, flow coating, bar coating, spray coating, and spin coating.

When the primer composition of the present invention is cured as described above, a primer layer having a coefficient of linear expansion of up to $150 \times 10^{-6}/°C$., and in particular, up to $125 \times 10^{-6}/°C$. can be produced. When the coefficient of linear expansion is too high, expansion and contraction of the coating corresponding to temperature change is increased and cracks are easily generated in the overlying polysiloxane hard coating and loss of adhesion at the interface. Although the coefficient of linear expansion is not particularly limited for its lower limit, it is generally at least $0/°C$., and in particular, at least $1 \times 10^{-6}/°C$. The coefficient of linear expansion is measured by the procedure as will be described below.

The plastic molded articles such as a plastic film and a plastic substrate formed with the cured coating of the primer composition of the present invention has excellent initial adhesion property, heat resistance, and resistance to hot water, and weatherability. When the coating of the primer composition is overcoated with a coating of a known organopolysiloxane composition, for example, at least one hydrolysate or co-hydrolysate of an organopolysiloxane composition represented by the following general formula (1):

$$(R^7)_m Si(OR^8)_{4-m} \qquad (1)$$

wherein $R^7$ is an organic group containing 1 to 10 carbon atoms, $R^8$ is hydrogen atom or a monovalent organic group, m is 0, 1, or 2, and cured at an elevated temperature of preferably 50 to 140° C. for 5 minutes to 3 hours, the plastic molded article is provided with the advantages such as adhesion, abrasion resistance, and weatherability due to the coating of the primer composition of the present invention by the synergetic action of the primer coating and the organopolysiloxane coating.

The organopolysiloxane composition is coated to a coating weight such that the thickness after curing at an elevated temperature is 0.2 to 20 μm, and in particular, 0.5 to 15 μm. When the coating is too thin, the desired hardness and abrasion resistance may not be obtained. When the coating is too thick, cracks may generate after the curing.

The method used for the coating is not particularly limited, and exemplary methods include roll coating, dip coating, flow coating, bar coating, spray coating, and spin coating.

The organic group $R^7$ in the formula (1) is an optionally substituted monovalent hydrocarbon group containing 1 to 10 carbon atoms such as an alkyl group, an aryl group, a halogenated alkyl group, a halogenated aryl group, an alkenyl group; an organic group in which a part of the hydrogen atoms of such hydrocarbon group is substituted with epoxy group, (meth)acryloxy group, mercapto group, amino group, or cyano group; or an organic group wherein a heteroatom such as O, NH, and $NCH_3$ is present in the hydrocarbon group. More specifically, the organic group $R^7$ may be an alkyl group such as methyl group, ethyl group, propyl group, isopropyl group, butyl group, hexyl group, decyl group, or cyclohexyl group; an aryl group such as phenyl group or phenethyl group; a halogenated alkyl group such as 3-chloropropyl group, 3,3,3-trifluoropropyl group, or 3,3,4,4,5,5,6,6,6-nanofluorohexyl group; a halogenated aryl group such as p-chlorophenyl group; an alkenyl group such as vinyl group, allyl group, 9-decenyl group, or p-vinylbenzyl group; an epoxy group-containing organic group such as 3-glycidoxypropyl group, β-(3,4-epoxycyclohexyl)ethyl group, and 9,10-epoxydecyl group; a (meth)acryloxy group-containing organic group such as γ-methacryloxy propyl group or γ-acryloxy propyl group; a mercapto group-containing organic group such as γ-mercaptopropyl group or p-mercaptomethylphenylethyl group; an amino group-containing organic group such as γ-aminopropyl group and (β-aminoethyl)-γ-aminopropyl group; or a cyano group-containing organic group such as β-cyanoethyl group.

$R^8$ is hydrogen atom or a monovalent organic group containing 1 to 10 carbon atoms, and exemplary organic groups include alkyl groups, alkenyl groups, alkoxyalkyl groups, and acyl groups. The preferred are alkyl groups and acyl groups such as methyl group, ethyl group, propyl group, isopropyl group, butyl group, hexyl group, phenyl group, isopropenyl group, methoxyethyl group, and acetyl group.

Examples of the silane compound satisfying such conditions include trialkoxy or triacyloxysilanes such as methyltrimethoxysilane, methyltriethoxysilane, methyltris(2-methoxyethoxy)silane, methyltriacetoxysilane, methyltripropoxysilane, methyltriisopropenoxysilane, methyltributhoxysilane, ethyltrimethoxysilane, ethyltriethoxysilane, vinyltrimethoxysilane, vinyltriethoxysilane, vinyltriacetoxysilane, vinyltris(2-methoxyethoxy)silane, vinyltriisopropenoxysilane, phenyltrimethoxysilane, phenyltriethoxysilane, phenyltriacetoxysilane, γ-chloropropyltrimethoxysilane, γ-chloropropyltriethoxysilane, γ-chloropropyltripropoxysilane, 3,3,3-trifluoropropyltrimethoxysilane, γ-glycidoxypropyltrimethoxysilane, γ-glycidoxypropylmethyldimethoxysilane, γ-glycidoxypropyltriethoxysilane, γ-glycidoxypropylmethyl diethoxysilane, β-(3,4-epoxycyclohexyl)ethyltrimethoxysilane, β-(3,4-epoxycyclohexyl)ethylmethyldimethoxysilane, β-(3,4-epoxycyclohexyl)ethyltriethoxysilane, β-(3,4-epoxycyclohexyl)ethylmethyldiethoxysilane, γ-methacryloxypropyltrimethoxysilane, γ-acryloxy propyltrimethoxysilane, γ-aminopropyltrimethoxysilane, γ-aminopropyltriethoxysilane, γ-mercaptopropyltrimethoxysilane, γ-mercaptopropyltriethoxysilane, N-(β-aminoethyl)-γ-aminopropyltrimethoxysilane, and β-cyanoethyltrimethoxysilane; and dialkoxysilane or diacyloxy silanes such as dimethyldimethoxysilane, dimethyldiethoxysilane, dimethyldi(2-methoxyethoxy)silane, dimethyl diacetoxy silane, dimethyl dipropoxy silane, dimethyl diisopropenoxy silane, dimethyl dibutoxy silane, vinylmethyldimethoxysilane, vinylmethyl diethoxysilane, vinylmethyl diacetoxy silane, vinylmethyl di(2-methoxyethoxy)silane, vinylmethyldiisopropenoxy silane, phenylmethyldimethoxysilane, phenylmethyldiethoxysilane, phenylmethyldiacetoxysilane, γ-propylmethyldimethoxysilane, γ-propylmethyldiethoxysilane, γ-propylmethyl dipropoxy silane, 3,3,3-trifluoropropylmethyldimethoxysilane, γ-methacryloxy propylmethyldimethoxysilane, γ-acryloxypropylmethyldimethoxysilane, γ-aminopropylmethyldimethoxysilane, γ-aminopropylmethyldiethoxysilane, γ-mercaptopropylmethyldimethoxysilane, γ-mercaptopropylmethyl diethoxysilane, N-(β-aminoethyl)-γ-aminopropylmethyldimethoxysilane, and β-cyanoethylmethyldimethoxysilane. Examples of the tetraalkoxysilane include methyl silicate, ethyl silicate, n-propyl silicate, n-butyl silicate, sec-butyl silicate and t-butyl silicate, and bissilane compounds such as bis(trimethoxysilyl)ethane, bis(trimethoxysilyl)hexane, bis(trimethoxysilyl)decane, bis(triethoxysilyl)hexane, bis(trimethoxysilyl)benzene, and bis(trimethoxysilyloxy dimethylsilyl)benzene.

The (co)hydrolysis of these silane compounds may be conducted by using one or more such silane compound, and these (co)hydrolysates of the silane compound may be used alone or in combination of two or more.

The (co)hydrolysate the silane compound can be produced by hydrolysis of the silane compound, for example, in the presence of an acid catalyst by adding water to the solution of the silane compound in lower alcohol. Examples of the lower alcohol include methanol, ethanol, isopropanol, and butanol, and examples of the solvent which can be simultaneously used with such alcohol include ketones such as acetone and acetyl acetone, and esters such as ethyl acetate and isobutyl acetate, and ethers such as propylene glycol monomethyl ether, dipropylene glycol monomethyl ether, and diisopropyl ether.

In view of improving scratch resistance, the preferred is coating of a colloidal silica-containing organopolysiloxane composition (composition for a hard coating) prepared by adding 5 to 70% by weight of colloidal silica to the organopolysiloxane composition. The colloidal silica may be prepared by dispersing 1 to 100 nm of fine silica particles in water or an alcohol such as methanol, ethanol, isobutanol, or propylene glycol monomethyl ether.

The colloidal silica may be added by simple addition to the organopolysiloxane composition, or by preliminarily mixing with the silane compound as described above and then conducting the hydrolysis. In the case of the colloidal silica dispersed in water, the water in the water dispersion of the colloidal silica may be used as a part of all of the water required for the hydrolysis of the silane compound.

The UV absorbents which can be added to the organopolysiloxane composition include inorganic UV absorbents such as titanium oxide, cerium oxide, zinc oxide, tin oxide, zirconium oxide, antimony oxide, tungsten oxide, antimony-containing tin oxide, tin-containing indium oxide, iron oxide, and alumina, which may be used as a single metal oxide, a mixed metal oxide, or a mixture thereof; and metal chelate compounds of titanium, zinc, and zirconium, and (partial) hydrolysates and condensates thereof; and organic UV absorbents such as a derivative of a compound having a hydroxy benzophenone, benzotriazole, cyano acrylate, or triazine skeleton; and a copolymer such as a (co)polymer such as vinyl polymer containing such UV absorbent in the side chain.

In addition, a catalytic amount of a quaternary ammonium salt, alkali metal salt of an organic acid, alkoxide or chelate of aluminum, titanium, chromium or iron, perchlorate salt, acid anhydride, polyamine, Lewis acid, or the like may be added as a curing catalyst of the organopolysiloxane composition.

The primer composition of the present invention is favorably used for various plastic materials, and in particular, for polycarbonate resin, polystyrene resin, (meth)acrylic resin, urethane resin, thiourethane resin, a polycondensate of halogenated bisphenol A and ethylene glycol, acrylic urethane resin, halogenated aryl group-containing acrylic resin, sulfur-containing resin, and complex laminate material comprising two or more such resin layers.

The plastic material coated by a polysiloxane hard coating has excellent optical properties, and therefore, it can be favorably used as an optical material.

EXAMPLES

Next, the present invention is described in further detail by referring to Synthetic Examples, Examples, and Comparative Examples which by no means limit the scope of the present invention. The parts and % in the following Examples indicate parts by weight and % by weight, respectively. The viscosity is the value measured at 25° C. according to JIS Z 8803. The weight average molecular weight is the one measured by gel permeation chromatography (GPC) by using standard polystyrene for the reference.

Synthesis of the Vinyl Polymer (A) Having a Hydrolyzable Silyl Group and/or SiOH Group and an Organic UV Absorbing Group Bonded to its Side Chain Synthetic Example 1

A 2 liter flask equipped with a stirrer, a condenser, and a thermometer was charged with 152 g of diacetone alcohol used for the solvent, and this solvent was heated to 80° C. in nitrogen stream. To this solvent, 240 g of the preliminarily prepared monomer mixture solution (a mixture of 67.5 g of 2-[2'-hydroxy-5'-(2-methacryloxyethyl)phenyl]-2H-benzotriazole (RUVA-93 manufactured by Otsuka Chemical Co., Ltd.), 90 g of γ-methacryloxy propyltrimethoxysilane, 270 g of methyl methacrylate, 22.5 g of glycidyl methacrylate, and 350 g of diacetone alcohol), and 54 g of the preliminarily prepared solution of 2.3 g of 2,2'-azobis(2-methylbutyronitrile (a polymerization initiator) in 177.7 of acetone alcohol were sequentially added. The reaction mixture was allowed to react at 80° C. for 30 minutes. The remaining preliminarily prepared monomer mixture solution and the remaining radical initiator solution were simultaneously added dropwise at 80 to 90° C. for 1.5 hours, and the mixture was stirred at 80 to 90° C. for 5 hours.

The resulting vinyl polymer having trimethoxysilyl group and an organic UV absorbing group bonded to its side chain had a viscosity of 5,050 mPa·s. Content of the UV absorbing monomer in the copolymer was 15%, and content of the vinyl monomer having the trimethoxy silyl group bonded to the side chain by the C—Si bond was 20%. The weight average molecular weight determined by GPC by using standard polystyrene for the reference was 60,800. The thus obtained vinyl polymer (solution) was designated A-1.

Synthetic Examples 2 and 3 and Comparative Synthetic Examples 1 and 2

The procedure of Synthetic Example 1 was repeated by using the compositions shown in Table 1 to prepare vinyl polymers A-2 and 3 and vinyl polymers RA-1 and 2 for comparison purpose.

Synthesis of an Organosilicon Compound Having Nitrogen Atom and a Hydrolyzable Silyl Group in its Molecule Synthetic Example 4

A 2 liter flask equipped with a stirrer, a condenser, and a thermometer was charged with 222 g of N-2-(aminoethyl)-3-aminopropyltrimethoxysilane and 242 g of silylating agent hexamethyldisilazane (a silylating agent), and the mixture was heated to 120° C. in nitrogen stream. To this mixture, 496 g of γ-glycidoxypropylmethyl diethoxysilane was added dropwise, and the mixture was allowed to react by stirring at 120° C. for 5 hours. The low boiling content was removed under reduced pressure at 100° C. to obtain 862 g of a viscous compound having a viscosity of 1,387 mPa·s.

Next, 862 g of this reaction mixture and 862 g of toluene were placed in a 2 liter flask equipped with a stirrer, a condenser, and a thermometer. 143 g of acetic anhydride was added dropwise to this mixture in nitrogen stream at room temperature, and the mixture was allowed to react by stirring at an elevated temperature of 110° C. for 2 hours. 141 g of methanol was added dropwise at 50° C., and the mixture was stirred at an elevated temperature of 50° C. for 1 hour. The low boiling content was then removed under reduced pressure at 100° C. to obtain a reddish brown transparent compound having a high viscosity.

This compound was evaluated by infrared absorption spectroscopy. The absorption caused by OH group or NH group was not detected in the region of not less than 3,000 cm$^{-1}$, and strong absorption caused by the presence of the amide group was found at 1,650 cm$^{-1}$.

The resulting compound was diluted with propylene glycol monomethyl ether (PGM) to the nonvolatile content (JIS K 6833) of 25%, and this dilution was designated the compound (solution) C-1 containing nitrogen atom and an alkoxy silyl group in the molecule.

Synthesis of Colloidal Silica-Containing Organopolysiloxane Composition

Synthetic Example 5

A 1 liter flask equipped with a stirrer, a condenser, and a thermometer was charged with 336 g of methyltriethoxysilane and 94 g of isobutanol, and this mixture was stirred with the temperature maintained at up to 5° C. in an ice bath. To this mixture was added 283 g of a water-dispersed colloidal silica (Snowtex 0 having an average particle diameter of 15 to 20 nm manufactured by Nissan Chemical Industries, Ltd.; SiO$_2$ content, 20%) at a temperature of up to 5° C., and after stirring the mixture in an ice bath for 3 hours and at 20 to 25° C. for 12 hours, 27 g of diacetone alcohol and 50 g of propylene glycol monomethyl ether were added to the mixture. Next, 3 g of 10% aqueous solution of sodium propionate and 0.2 g of polyether modified silicone KP-341 (manufactured by Shin-Etsu Chemical Co., Ltd.) (a leveling agent) were added, and the mixture was adjusted to a pH of 6 to 7 with acetic acid. Next, isobutanol was added to adjust the nonvolatile content (JIS K 6833) to 20%, and the mixture was aged at room temperature for 5 days to obtain an organopolysiloxane composition containing colloidal silica. This composition had a viscosity of 4.2 mm$^2$/s and a weight average molecular weight determined by GPC of 1,100. This product was designated colloidal silica-containing organopolysiloxane composition HC-1.

Synthetic Example 6

A 2 liter flask equipped with a stirrer, a condenser, and a thermometer was charged with 328 g of methyltrimethoxysilane and 10 g of 3,3,3-trifluoropropyltrimethoxysilane, and this mixture was stirred while maintaining the temperature at 20° C. To this mixture, 98 g of a water-dispersed colloidal silica (Snowtex O having an average particle diameter of 15 to 20 nm manufactured by Nissan Chemical Industries, Ltd.; SiO$_2$ content, 20%) and 230 g of 0.25N aqueous solution of acetic acid were added, and the mixture was stirred for 3 hours. After continuing the stirring at 60° C. for 3 hours, 300 g of cyclohexanone was added, and the byproduct methanol was removed by distillation at normal pressure. Next, 300 g of isopropanol, 134 g of 0.25% isopropanol solution of tetrabutyl ammonium hydroxide, and 0.5 g of polyether modified silicone KP-341 (manufactured by Shin-Etsu Chemical Co., Ltd.) (a leveling agent) were added, and the nonvolatile content (JIS K 6833) was adjusted to 20% to thereby obtain an organopolysiloxane composition containing colloidal silica. This composition had a viscosity of 4.3 mm$^2$/s, and a weight average molecular weight determined by GPC of 2,300. This product was designated colloidal silica-containing organopolysiloxane composition HC-2.

TABLE 1

Composition of the vinyl polymer (A) having an alkoxysilyl group and an organic UV absorbing group bonded to its side chain

| | | | | (Parts by weight) | |
| | Synthesis Example | | | Comparative Synthesis Example 1 | Comparative Synthesis Example 2 |
| | 1 | 2 | 3 | | |
|---|---|---|---|---|---|
| Vinyl polymer | A-1 | A-2 | A-3 | RA-1 | RA-2 |
| MPTMS | 90 | 45 | 135 | 90 | |
| RUVA-1 | 67.5 | 45 | | | 67.5 |
| RUVA-2 | | | 112 | | |
| MMA | 270 | 285 | 203 | 337.5 | 355 |
| GMA | 22.5 | 45 | | 22.5 | 22.5 |
| VIAc | | 25 | | | |
| MHALS | | 5 | | | 5 |
| Total | 450 | 450 | 450 | 450 | 450 |

Note:
MPTMS: γ-methacryloxypropyltrimethoxysilane
RUVA-1: 2-[2'-hydroxy-5'-(2-methacryloxyethyl) phenyl]-2H-benzotriazole (RUVA-93 manufactured by Otsuka Chemical Co., Ltd.)
RUVA-2: 2-hydroxy-4-(2-acryloxyethyl) benzophenone (BP-1A manufactured by Osaka Organic Chemical Industry Ltd.)
MMA: methyl methacrylate
GMA: glycidyl methacrylate
VIAc: vinyl acetate
MHALS: 1,2,2,6,6-pentamethyl-4-piperidyl methacrylate Examples 1 to 4 and Comparative Examples 1 to 4

Next the Examples of the primer composition are described. The abbreviation used in the Examples and the Comparative Examples not defined in the Synthetic Examples are as defined below.
<Fine Silica Particles Dispersed in an Organic Solvent>
B-1: dispersion of colloidal silica in propylene glycol monomethyl ether acetate (PMA-ST having a solid concentration of 30% and a primary particle size of 10 to 15 nm manufactured by Nissan Chemical Industries, Ltd.)
B-2: dispersion of colloidal silica in methyl ethyl ketone (MEK-ST having a solid concentration of 30% and a primary particle size of 10 to 15 nm manufactured by Nissan Chemical Industries, Ltd.)
B-3: dispersion of colloidal silica in methyl isobutyl ketone (MIBK-ST having a solid concentration of 30% and a primary particle size of 10 to 15 nm manufactured by Nissan Chemical Industries, Ltd.)
<Thermoplastic Resin>
POL-1: A 40% solution of polymethyl methacrylate resin (Dianal BR-80 manufactured by Mitsubishi Rayon Co., Ltd.) in diacetone alcohol
<Organic UV Absorbent>
UVA-1: 2-[2-hydroxy-4-(1-octyl oxycarbonyl ethoxy)phenyl]-4,6-bis(4-phenyl phenyl)-1,3,5-triazine (Tinuvin 479 manufactured by Ciba Specialty Chemicals)
UVA-2: 2,2',4,4'-tetrahydroxy benzophenone (Seesorb 106 manufactured by ShiproKasei Kaisha, Ltd.)

<Inorganic UV Absorbent>
UVA-3: A 15% dispersion of fine zinc oxide particles in an alcoholic solvent (ZNAP 15WT % manufactured by C.I. Kasei Co., Ltd.)
<Hindered Amine Light Stabilizer>
HALS-1: N-acetyl-3-dodecyl-1-(2,2,6,6-tetramethyl-4-piperidinyl)pyrrolidine-2,5-dione (Sanduvor 3058 Liq. manufactured by Clariant (Japan) K.K.)

The physical properties were evaluated in the Examples by the procedures as described below.

The evaluation was conducted for the coating formed solely by curing the primer composition of the present invention and a laminate of this coating with the cured layer of colloidal silica-containing organopolysiloxane composition.

(1) Gel fraction: the primer composition was dip coated to a glass plate and then cured at 135° C. for 1 hour. After allowing the cured composition to cool to room temperature, the weight ($W_1$) of the initial cured primer coating was measured. Then, the whole of the cured primer coating is immersed in acetone at room temperature for 1 hour, dried at 105° C. for 1 hour, and the weight ($W_2$) of the cured primer coating after the acetone extraction. The gel fraction (G) is calculated as follows:

$$G(\%) = (W_2/W_1) \times 100.$$

(2) Coefficient of linear expansion: 1.5 g of the primer composition was weighed in an aluminum cup, and the composition was allowed to stand at room temperature for 8 hours to remove the volatile components. The primer composition was then cured on a hot plate at 80° C. for 1 hour and at 130° C. for 1 hour. After allowing the cured composition to cool to room temperature, the cured primer coating were peeled off the aluminum cup, and test pieces of 15 mm×5 mm was stamped out of the resulting coating (thickness, about 150 µm).
Analyzer: TMA7000 (a thermomechanical analyzer manufacture by ULVAC-RIKO, Inc.)
Temperature conditions:
  25 to 150° C. at a temperature elevation rate of 5° C./minute
Load: 5 g
Atmosphere: air
Measurement: average of 3 measurements at a temperature in the range of 35 to 45° C.

(3) Initial outer appearance of the coating: A layer of the primer composition, and a layer of the colloidal silica-containing organopolysiloxane composition were deposited and cured in this order, and the test piece of the thus produced laminate was visually evaluated for its outer appearance.

(4) Primary adhesion: Primary adhesion was evaluated according to JIS K 5400 by forming the test piece with 6 cross cuts in both length and breadth directions at an interval of 2 mm by a blade to form 25 squares. A commercially available cellophane adhesive tape was carefully applied on the cross cut surface and then suddenly peeled off at an angle of 90° to count the number of squares remaining on the surface (X). The results are shown as X/25.

(5) Water resistance and water resistant adhesion: The test piece was immersed in boiling water for 2 hours. Outer appearance was then visually inspected, and adhesion test was conducted by repeating the procedure of (4).

(6) Scratch resistance test: Haze after 500 rotations was evaluated according to ASTM 1044 by using Taber abrasion tester equipped with abrasion wheel CS-10F at a load of 500g. The scratch resistance (%) is indicated by [(haze after the test)-(haze before the test)].

(7) Weatherability test: The test was conducted by using Eye Super UV tester manufactured by Iwasaki Electric Co., Ltd., and repeating the cycle of [5 hours at black panel temperature of 63° C., humidity of 50% RH, illuminance of 50 mW/cm², and rainfall of 10 seconds/1 hour]→[1 hour at black panel temperature of 30° C., and humidity of 95% RH] for 250 hours and 500 hours. Before and after the weatherability test, yellowing was measured according to JIS K 7103, and cracks and peeling of the coating after the weatherability test was observed with naked eye and under microscope (magnification of 250).

[Cracks in the Coating after the Weatherability Test]
Outer appearance of the coating after the weatherability test was evaluated by the following criteria.
  A: no cracks
  B: few cracks
  C: cracks all over the coating

[Peeling of the Coating after the Weatherability Test]
The coating after the weatherability test was evaluated for its condition by the following criteria.
  A: no peeling
  B1: partial peeling between the layer of the colloidal silica-containing organopolysiloxane composition and the layer of the primer composition
  B2: partial peeling between the layer of the primer composition and the substrate
  C1: complete peeling between the layer of the colloidal silica-containing organopolysiloxane composition and the layer of the primer composition
  C2: complete peeling between the layer of the primer composition and the substrate The composition (in terms of solid content) in Tables 2 and 3 was diluted with a solvent mixture of diacetone alcohol and propylene glycol monomethyl ether at a molar ratio of 20/80 so that concentration of the total solid was 10%. This dilution was used in the coating.

The resulting primer composition was coated by dip coating on a plate of polycarbonate resin (Iupilon Sheet manufactured by Mitsubishi Engineering-Plastics Corporation; thickness, 0.5 mm) after cleaning its surface. The composition was coated to a thickness such that the coating after the curing had a thickness of about 6 to 8 µm, and the coating was cured at 135° C. for 30 minutes. This coating was overcoated by dip coating with a mixture of the colloidal silica-containing organopolysiloxane composition (HC-1 and 2) prepared in the Synthetic Examples 5 and 6 and an additive such as UV absorbent (UVA-2 and 3). The composition was coated to a thickness such that the coating after the curing had a thickness of about 2 to 3 µm, and the coating was cured at 135° C. for 1 hour. The thus produced coating was used for the test piece for evaluation of various physical properties. The results are shown in Tables 2 and 3.

Example 5

The composition having the formulation converted as solid matter shown in Table 2 was diluted with a mixed solvent of diacetone alcohol and propylene glycol monomethylether acetate in a weight ratio of 20/80 so that the concentration of the total of the solid matters became 10% by weight, and heated at 60° C. for 3 hours to prepare a primer composition. The primer composition was cured and the thus produced coating was evaluated for various physical properties in the same manner as in Examples 1 to 4.

TABLE 2

Composition (in terms of solid content) and properties of the coating

| | Example | | | | |
|---|---|---|---|---|---|
| | 1 | 2 | 3 | 4 | 5 |
| (A) Vinyl polymer having an alkoxysilyl group and a UV absorbing group | A-1 100 parts | A-2 100 parts | A-3 100 parts | A-1 100 parts | A-1 100 parts |
| (B) Fine silica particles dispersed in an organic solvent | B-1 18 parts | B-2 10 parts | B-3 100 parts | B-2 33 parts | B-1 18 parts |
| (C) (N + alkoxysilyl group) containing organosilicon compound | | C-1 5 parts | | | |
| Thermoplastic resin | | | POL-1 40 parts | | |
| Additive | | HALS-1 1 part | | UVA-1 3 parts | |
| Colloidal silica-containing organopolysiloxane composition | HC-2 100 parts | HC-2 100 parts | HC-1 100 parts | HC-2 100 parts | HC-1 100 parts |
| Additive | | UVA-3 1 part | | UVA-2 2 parts | |
| Results of the evaluation | | | | | |
| Heating | No | No | No | No | Yes |
| Gel fraction (%) | 86 | 81 | 97 | 91 | 98 |
| Coefficient of linear expansion ($\times 10^{-6}$/°C.) | 38.1 | 114.6 | 29.1 | 98.4 | 30.5 |
| Initial outer appearance | No defects | No defects | No defects | No defects | No defects |
| Primary adhesion | 25/25 | 25/25 | 25/25 | 25/25 | 25/25 |
| Water resistant outer appearance | No defects | No defects | No defects | No defects | No defects |
| Water resistant adhesion | 25/25 | 25/25 | 25/25 | 25/25 | 25/25 |
| Scratch resistance (%) | 3 | 5 | 2 | 4 | 3 |
| Weatherability after 250 hours Yellowing | <1 | <1 | <1 | <1 | <1 |
| Weatherability after 250 hours Cracks in the coating | A | A | A | A | A |
| Weatherability after 250 hours Peeling of the coating | A | A | A | A | A |
| Weatherability after 500 hours Yellowing | 4 | 6 | 3 | 4 | 3 |
| Weatherability after 500 hours Cracks in the coating | A | A | A | A | A |
| Weatherability after 500 hours Peeling of the coating | A | A | A | A | A |

TABLE 3

Composition (in terms of solid content) and properties of the coating

| | Comparative Example | | | |
|---|---|---|---|---|
| | 1 | 2 | 3 | 4 |
| (A) Vinyl polymer having an alkoxysilyl group and a UV absorbing group | RA-1 100 parts | RA-2 100 parts | A-1 100 parts | A-2 100 parts |
| (B) Fine silica particles dispersed in an organic solvent | B-1 18 parts | B-1 18 parts | | |
| (C) (N + alkoxysilyl group) containing organosilicon compound | | | | C-1 5 parts |
| Thermoplastic resin | | | | |
| Additive | | | | HALS-1 1 part |
| Colloidal silica-containing organopolysiloxane composition | HC-1 100 parts | HC-1 100 parts | HC-1 100 parts | HC-1 100 parts |
| Additive | | | UVA-1 2 parts | |
| Results of the evaluation | | | | |
| Heating | No | No | No | No |
| Gel fraction (%) | 75 | 49 | 36 | 89 |

TABLE 3-continued

Composition (in terms of solid content) and properties of the coating

|  |  | Comparative Example | | | |
|---|---|---|---|---|---|
|  |  | 1 | 2 | 3 | 4 |
| Coefficient of linear expansion ($\times 10^{-6}/°$ C.) | | 88.3 | 143.5 | 245.2 | 198.1 |
| Initial outer appearance | | No defects | No defects | No defects | No defects |
| Primary adhesion | | 25/25 | 25/25 | 25/25 | 25/25 |
| Water resistant outer appearance | | No defects | Slightly turbid | Slightly turbid | No defects |
| Water resistant adhesion | | 25/25 | 10/25 | 25/25 | 25/25 |
| Scratch resistance (%) | | 3 | 2 | 4 | <1 |
| Weatherability after 250 hours | Yellowing | 8 | 3 | 2 | 2 |
| | Cracks in the coating | A | C | B | A |
| | Peeling of the coating | B2 | C1 | A | A |
| Weatherability after 500 hours | Yellowing | 24 | — | 16 | 9 |
| | Cracks in the coating | C | — | C | B |
| | Peeling of the coating | C2 | — | C1, 2 | B1 |

Japanese Patent Application Nos. 2006-285173 and 2007-036412 are incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A primer composition for a polysiloxane hard coating, comprising:
(A) a vinyl polymer having a hydrolyzable silyl group and/or SiOH group and an organic UV absorbing group bonded to its side chain; and
(B) silica particles having a primary particle size of 0.5 to 100 nm dispersed in an organic solvent;
wherein:
the silica particles are present in an amount such that the solid content of the silica particles is 0.1 to 100 parts by weight in relation to 100 parts by weight of the vinyl polymer (A);
the primer composition does not contain a thermoplastic vinyl resin; and
a primer layer formed by coating and curing the primer composition has a coefficient of linear expansion of up to $150 \times 10^{-6}/°$ C.

2. The primer composition according to claim 1 wherein the vinyl polymer having a hydrolyzable silyl group and/or SiOH group and an organic UV absorbing group bonded to its side chain (A) is produced by copolymerizing monomer components comprising
(a) a vinyl monomer having a hydrolyzable silyl group and/or SiOH group bonded thereto through C—Si bond,
(b) a vinyl monomer having an organic UV absorbing group, and
(c) a copolymerizable monomer other than (a) and (b).

3. The primer composition according to claim 1 wherein the primer composition further comprises
(C) a hydrolyzable silicon compound and/or its hydrolyzation and condensation product.

4. The primer composition according to claim 3 wherein the hydrolyzable silicon compound and/or its hydrolyzation and condensation product (C) is a compound having nitrogen atom and alkoxysilyl group in its molecule.

5. A coated article comprising a substrate, a coating of the primer composition of claim 1 formed on the substrate, and a polysiloxane hard coating formed on the primer coating.

6. The coated article according to claim 5 wherein the polysiloxane hard coating is formed from a hard coating composition comprising a hydrolysate or a co-hydrolysate of at least one organoxysilane represented by the formula (1):

$$(R^7)_m Si(OR^8)_{4-m} \qquad (1)$$

wherein $R^7$ is an organic group containing 1 to 10 carbon atoms, $R^8$ is hydrogen atom or a monovalent organic group, and m is 0, 1, or 2; and fine silica particles.

7. The primer composition according to claim 1, wherein said silica particles (B) dispersed in the organic solvent have a primary particle size of 2 to 50 nm.

8. The primer composition according to claim 1, wherein said silica particles (B) are present in an amount so that the solid content of said silica particles is 1 to 50 parts by weight in relation to 100 parts by weight of the resin component in the vinyl polymer (A).

9. The primer composition according to claim 1, wherein the organic solvent used for preparing the dispersion of the silica particles in an organic solvent is at least one selected from the group consisting of methanol, ethanol, isopropanol, n-butanol, ethylene glycol, ethyl cellosolve, butyl cellosolve, propylene glycol monomethyl ether, propylene glycol monomethyl ether acetate, dimethylformamide, dimethyl acetamide, methyl ethyl ketone, methyl isobutyl ketone, xylene/n-butanol mixture, and ethylene glycol mono-n-propyl ether.

10. The primer composition according to claim 1, wherein the organic solvent used for preparing the dispersion of the silica particles in an organic solvent is at least one selected from the group consisting of ethylene glycol, ethylene glycol mono-n-propyl ether, ethyl cellosolve, butyl cellosolve, propylene glycol monomethyl ether, propylene glycol monomethyl ether acetate, methyl ethyl ketone, and methyl isobutyl ketone.

11. A primer composition for a polysiloxane hard coating, comprising:
(D) an organic/inorganic composite product obtained by reacting:

(A) a vinyl polymer having a hydrolyzable silyl group and/or SiOH group and an organic UV absorbing group bonded to its side chain; and (B) silica particles having a primary particle size of 0.5 to 100 nm dispersed in an organic solvent;

wherein:

the silica particles are present in an amount such that the solid content of the silica particles is 0.1 to 100 parts by weight of the vinyl polymer (A);

the primer composition does not contain a thermoplastic vinyl resin; and a primer layer formed by coating and curing the primer composition has a coefficient of linear expansion of up to $150 \times 10^{-6}/°C$.

12. The primer composition according to claim 11 wherein the vinyl polymer having a hydrolyzable silyl group and/or SiOH group and an organic UV absorbing group bonded to its side chain (A) is produced by copolymerizing monomer components comprising (a) a vinyl monomer having a hydrolyzable silyl group and/or SiOH group bonded thereto through C—Si bond, (b) a vinyl monomer having an organic UV absorbing group, and (c) a copolymerizable monomer other than (a) and (b).

13. The primer composition according to claim 11 wherein the primer composition further comprises (C) a hydrolyzable silicon compound and/or its hydrolyzation and condensation product.

14. The primer composition according to claim 13 wherein the hydrolyzable silicon compound and/or its hydrolyzation and condensation product (C) is a compound having nitrogen atom and alkoxysilyl group in its molecule.

15. A coated article comprising a substrate, a coating of the primer composition of claim 11 formed on the substrate, and a polysiloxane hard coating formed on the primer coating.

16. The coated article according to claim 15 wherein the polysiloxane hard coating is formed from a hard coating composition comprising a hydrolysate or a co-hydrolysate of at least one organoxysilane represented by the formula (1):

$$(R^7)_m Si(OR^8)_{4-m} \qquad (1)$$

wherein $R^7$ is an organic group containing 1 to 10 carbon atoms, $R^8$ is hydrogen atom or a monovalent organic group, and m is 0, 1, or 2; and fine silica particles.

17. The primer composition according to claim 11, wherein said silica particles (B) dispersed in the organic solvent have a primary particle size of 2 to 50 nm.

18. The primer composition according to claim 11, wherein said silica particles (B) are present in an amount so that the solid content of said silica particles is 1 to 50 parts by weight in relation to 100 parts by weight of the resin component in the vinyl polymer (A).

19. The primer composition according to claim 11, wherein the organic solvent used for preparing the dispersion of the silica particles in an organic solvent is at least one selected from the group consisting of methanol, ethanol, isopropanol, n-butanol, ethylene glycol, ethyl cellosolve, butyl cellosolve, propylene glycol monomethyl ether, propylene glycol monomethyl ether acetate, dimethylformamide, dimethyl acetamide, methyl ethyl ketone, methyl isobutyl ketone, xylene/n-butanol mixture, and ethylene glycol mono-n-propyl ether.

20. The primer composition according to claim 11, wherein the organic solvent used for preparing the dispersion of the silica particles in an organic solvent is at least one selected from the group consisting of ethylene glycol, ethylene glycol mono-n-propyl ether, ethyl cellosolve, butyl cellosolve, propylene glycol monomethyl ether, propylene glycol monomethyl ether acetate, methyl ethyl ketone, and methyl isobutyl ketone.

* * * * *